F. R. ALFORD.
FRICTION SPRING FOR CLOCKS, WATCHES, &c.
APPLICATION FILED MAY 2, 1908.
911,534.
Patented Feb. 2, 1909.
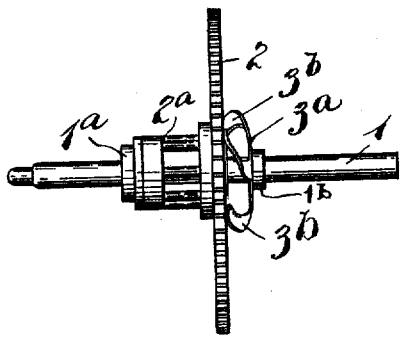
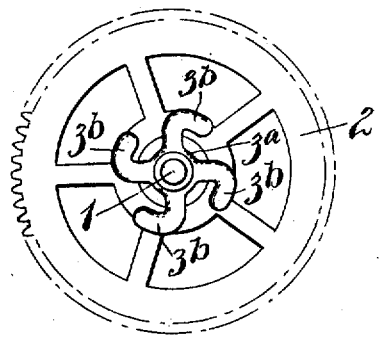
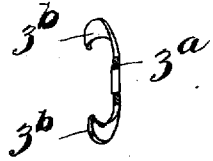
Witnesses:
Inventor
F. R. Alford
By his Attorneys

UNITED STATES PATENT OFFICE.

FRANK R. ALFORD, OF WINSTED, CONNECTICUT, ASSIGNOR TO WM. L. GILBERT CLOCK COMPANY, OF WINSTED, CONNECTICUT, A CORPORATION OF CONNECTICUT.

FRICTION-SPRING FOR CLOCKS, WATCHES, &c.

No. 911,534.  Specification of Letters Patent.  Patented Feb. 2, 1909.

Application filed May 2, 1908. Serial No. 430,532.

*To all whom it may concern:*

Be it known that I, FRANK R. ALFORD, a citizen of the United States, residing at Winsted, Litchfield county, State of Connecticut, have invented certain new and useful Improvements in Friction-Springs for Clocks, Watches, &c., of which the following is a full, clear, and exact description.

My invention relates to improvements in clock and watch mechanism, and particularly to a friction spring therefor.

The object of the invention is to provide a friction spring of superior construction and of particular advantage where employed in connection with an arbor frictionally supporting one of the clock wheels.

In the accompanying drawings I have shown one form of my invention applied to part of a watch or clock-work mechanism on a relatively enlarged scale.

Referring to the drawings, Figure 1 is a side view of an arbor, clock-wheel, and friction spring combined; Fig. 2 is an end view thereof looking from right to left; Fig. 3 is a section of the spring detached.

1 represents an arbor. 2 is a toothed wheel supported thereon, having a laterally projecting pinion 2ª. This wheel and pinion are designed to be frictionally mounted upon arbor 1.

1ª is a friction shoulder on the arbor to take end thrust of the pinion and wheel in one direction. At the opposite side of the wheel is my improved friction spring, held in place by a shoulder 1ᵇ on said arbor 1.

My improved friction spring comprises the center hub 3ª and the spring arms 3ᵇ 3ᵇ. In the preferred construction these spring arms extend outwardly for a slight distance away from the hub 3ª and are then curved circumferentially, thereby giving a greater length to each spring arm and securing a correspondingly superior spring effect. When the spring is in place on the arbor, the spring arms 3ᵇ 3ᵇ bear upon the central part of the wheel 2 around the arbor, and at such points as to give practically a uniform support. Any desired number of spring arms 3ᵇ may be provided, but most efficient results are attained by the use of three or more.

In the past the great difficulty has been to obtain, in such compact space as afforded in a watch or clock, sufficient spring action in the spring itself. Heretofore the spring arms have been comparatively short and correspondingly stiff, with the result that they cut into the material and produce thereby not only injury, but uncertain and uneven action, owing to their tendency to lock in place. By the effective bearing provided by my improved spring this danger is eliminated and at the same time a sufficient frictional engagement is present to cause the arbor to turn with the wheel under normal conditions. In the preferred form of making these springs, the same are punched, and in the punching operation the spring arms 3ᵇ are punched from one side, while the arbor passage through hub 3ª is punched from the opposite side. This method is preferably followed because the tendency of the punch is to raise a bur and put a slight curve in the material, as best seen in the sectional view, Fig. 3. Instead of having this work to a disadvantage, the punching is done from the side, so that any bur formed will be away from the bearing surface. The result is, the frictional bearing surfaces of the spring arms are dished to produce on the projected side a smooth, rounded bearing surface to engage the wheel. So also, the hub bearing surface is convexed where it engages the abutment 1ᵇ. As shown, the spring arms are offset out of the plane of the hub, as best seen in Figs. 1 and 3.

By the term "circumferentially" as employed herein it shall not be understood that the curve of the spring arm should be on the exact circumference of a circle, since I have used said term in a broad relative sense to define the general direction in the curve of the spring arms after they leave the hub.

What I claim is:

1. A friction spring for timepieces comprising spring arms extending outwardly, then curved circumferentially and offset and ending in smooth frictional extensions.

2. A friction spring for timepieces comprising a hub and spring arms extending outwardly therefrom, then curved circumferentially and offset, and ending in smooth surfaced extensions having rounded frictional bearing surfaces.

3. A friction spring for clock and watch mechanism, comprising a hub, a plurality of spring arms formed integrally therewith around the same, the bearing ends of said arms being dished to furnish spherically bulged bearing faces.

4. A friction spring for clock and watch mechanism, comprising a hub, a plurality of spring arms formed integrally therewith around the same, the bearing faces thereof being convexed, said hub having a central arbor passage, the bearing surface of said hub being convexed at said arbor passage.

5. In a spring for clock and watch mechanism, a central perforated hub, a plurality of outwardly directed curved spring arms arranged around said hub, the bearing surfaces of said hub and spring arms being convexed.

6. A friction spring for clock and watch mechanism, comprising a hub, a plurality of spring arms formed integrally therewith around the same, said hub having a central arbor passage, the bearing surface of said hub being convexed at said arbor passage.

FRANK R. ALFORD. [L. S.]

Witnesses:
HARVEY L. SLAUSON,
RUSSELL M. WILLIAMS.